United States Patent [19]

Oppelt

[11] 4,152,321
[45] May 1, 1979

[54] LIGHT-STABLE POLYMER COMPOSITIONS AND PROCESSES THEREFOR

[75] Inventor: John C. Oppelt, Bridgewater, N.J.

[73] Assignee: American Cyanamid Company, Stamford, Conn.

[21] Appl. No.: 961,698

[22] Filed: Aug. 7, 1978

[51] Int. Cl.$^2$ .............................................. C08K 5/17
[52] U.S. Cl. ............................. 260/45.85 R; 106/178; 106/181; 106/185
[58] Field of Search ................. 260/45.85 T, 45.85 R; 106/181, 185, 178

[56] References Cited

U.S. PATENT DOCUMENTS

| | | | |
|---|---|---|---|
| 2,394,010 | 2/1946 | Quarles | 260/45.85 T |
| 2,432,586 | 12/1947 | Quarles | 260/45.85 T |
| 3,890,357 | 6/1975 | Rubin et al. | 252/51.5 A |

*Primary Examiner*—V. P. Hoke
*Attorney, Agent, or Firm*—B. F. Jacobs

[57] ABSTRACT

The use of N,N-disubstituted aminoethyl esters as ultraviolet light stabilizers in polymers, particularly polypropylene, is disclosed.

16 Claims, No Drawings

LIGHT-STABLE POLYMER COMPOSITIONS AND PROCESSES THEREFOR

This invention relates to light-stable polymer compositions and processes for the preparation thereof. More particularly, it relates to compositions of matter comprising a polymer normally subject to degradation by ultraviolet radiation, particularly polyolefins, and an effective amount of a compound of formula (I),

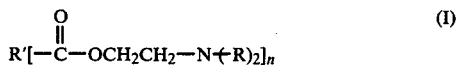

wherein R is alkyl of 6 to 18 carbon atoms or cycloalkyl of 5 to 8 carbon atoms, n is 1 or 2; and R' is alkyl of 9 to 18 carbon atoms, alkylene of 1 to 8 carbon atoms, phenyl or substituted phenyl, phenylene or substituted phenylene, phenylenebis (alkylene) or substituted phenylenebis (alkylene) wherein the alkylene groups have 1 to 3 carbon atoms, and cycloalkylenebis (alkylene) wherein the cycloalkylene has 5 to 8 carbon atoms and the alkylene groups have 1 to 3 carbon atoms, wherein the substituents in each case are hydroxyl, alkyl of 1 to 8 carbon atoms or alkoxy of 1 to 8 carbon atoms, to stabilize said polymer against degradation by ultraviolet light.

Preferably, the stabilizer compound is a compound wherein R is cyclohexyl.

Compounds of formula I wherein n is 1 are disclosed in U.S. Pat. No. 3,890,357 as additives to petroleum oils.

It is well-known that sunlight and other sources of ultraviolet radiation cause degradation of some polymers as evidenced by embrittlement or yellowing of plastic articles made therefrom. It is also well-known that this degradation can be inhibited by use of ultraviolet light stabilizers incorporated in or on such articles. Various additives, used alone or in combinations have been suggested to inhibit such degradation in order to prolong the useful lives of articles made from such polymers, c.f. U.S. Pat. Nos. 3,288,748, 3,547,875, 3,367,587 and 3,787,354. Since none has been found to be completely satisfactory, research continues in order to find compounds or combinations of compounds which will be more satisfactory. The present invention arose out of such research and resulted in the discovery of the present compounds which stabilize polymers against degradation by ultraviolet radiation.

In accordance with the present invention there is provided a composition of matter comprising a polymer normally subject to degradation by ultraviolet light and an effective amount of a compound of formula (I) to stabilize said polymer against deterioration by ultraviolet radiation.

The compounds of formula (I) may be prepared by reacting an acid chloride of formula (II) and an N,N-dialkylaminoethanol in the presence of a slight excess of pyridine, removing the precipitated pyridine hydrochloride and recovering the compound of formula (I) from the mother liquor. The general reaction is illustrated below:

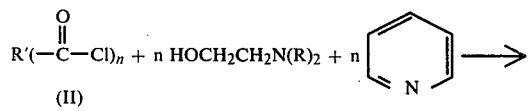

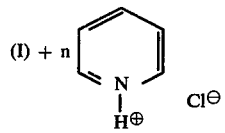

The preparation of compounds of formula (I), wherein n is 1, by another method, is also disclosed in U.S. Pat. No. 3,890,357, incorporated herein by reference.

The following compounds are examples illustrative of the compounds of formula (I): bis(2-di-n-laurylaminoethyl)terephthalate, bis(2-dicyclopentylaminoethyl)phthalate, bis(2-dicyclohexylaminoethyl)terephthalate, bis(2-dicyclohexylaminoethyl)phthalate, bis(2-dicyclohexylaminoethyl)isophthalate, bis(2-dicyclohexylaminoethyl)-2-methylterephthalate, bis(2-dicyclohexylaminoethyl)-2-hydroxyterephthalate, bis(2-dicyclohexylaminoethyl)-2-methoxyterephthalate, bis(2-dicyclohexylaminoethyl)adipate, bis(2-dicyclohexylaminoethyl)malonate, 2-dicyclohexylaminoethyl stearate, 2-dicyclohexylaminoethyl palmitate, 2-dicyclopentylaminoethyl stearate, 2-di-n-laurylaminoethyl stearate, 2-di-n-octadecylaminoethyl stearate, bis(2-dicyclohexylaminoethyl-1,4-cyclohexylenediacetate, bis(2-di-n-laurylaminoethyl)-1,3-cyclohexylenediacetate, bis(2-di-n-octadecylaminoethyl)-1,2-cyclohexylenediacetate, bis(2-dicyclohexylaminoethyl)-1,4-benzenediacetate, bis(2-di-n-laurylaminoethyl)-1,3-benzenediacetate, bis(2-di-n-octadecylaminoethyl)-1,2-benzenediacetate, bis(2-dicyclohexylaminoethyl)-2,4-dimethyl-1,4-cyclohexylenediacetate, bis(2-dicyclohexylaminoethyl)-2-methyl-1,4-benzenediacetate and the like.

Illustrative of polymers which may be used as the polymeric material in the subject invention are the following: propylene, polyethylene, poly(vinyl chloride), poly(methyl methacrylate), polystyrene, high impact poly(styrene), polycarbonate, poly(caprolactam), poly(hexamethylene adipamide), poly(hexamethylene terephthalamide), poly(methyl acrylate), poly(ethylene terephthalate), cellulose acetate, poly(vinylidene chloride), butadiene-styrene copolymers, acrylonitrile-styrene copolymers, butadiene-acrylonitrile-styrene copolymers and the like, and blends thereof.

The preferred material is polypropylene.

The amount of the compound of formula (I) needed to be effective amount for stabilizing the polymer against degradation will depend on the nature of the polymer and the amount of exposure to ultraviolet radiation to which the article will be subjected. For most purposes it is sufficient to use an amount of the compound of formula (I) within the range of about 0.01 to about 5 percent by weight, preferably 0.1 to 2 percent by weight, based on the weight of untreated polymer.

The stabilizer compound may be incorporated in or on such polymer materials by any of the various procedures known in the art for such purpose, such as by dry blending the additive with the polymer in powder or granular form followed by milling, Banbury mixing, molding, casting, extruding, swelling, and the like; by immersing the polymer as film, sheet, fibers, etc. in a solution of the additive in an appropriate solvent (as in a dyeing process), etc.

The compounds of formula (I) may be used in the polymers alone or in combination with other additives, such as fillers, antioxidants, flame retardants, heat stabilizers, antislipping and antistatic agents, supplemental light stabilizers, pigments, dyes, etc.

As with the compound of formula (I), any further additive is advantageously employed in a proportion within the range standard in the art of from about 0.01 to about 5 percent by weight, preferably 0.1 percent to 2 percent by weight, based on the weight of untreated polymer.

Illustrative of suitable antioxidants useful with the present stabilizers are those of the hindered-phenol type, such as 2,6-di-t-butyl-p-cresol; 4,4'-bis(2,6-di-t-butylphenol); 4,4'-bis(2,6-di-iso-propylphenyl); 2,4,6-tri-t-butylphenol; 2,2'-thiobis(4-methyl-6-t-butylphenol); octadecyl 2(3', 5'-di-t-butyl-4'-hydroxyphenyl)propionate; etc.; esters of thiopropionic acid, such as dilauryl thiodipropionate and distearyl thiodipropionate, etc.; hydrocarbyl phosphites, such as triphenyl phosphite, trinonyl phosphite, diphenyldecyl phosphite, etc.; and combinations thereof.

Illustrative examples of supplemental light stabilizers are those of the benzotriazole class, such as 2-(2'-hydroxy-5'-methylphenyl)benzotriazole; 2-(2'-hydroxy-3', 5'-di-t-butylphenyl)-5-chlorobenzotriazole; those of the hydroxybenzophenone type, such as 2-hydroxy-4-methoxybenzophenone; 2-hydroxy-4-octyloxybenzophenone; 2,2'-dihydroxy-4, 4'-dimethoxybenzophenone; hindered phenol esters, such as 2',4'-di-t-butylphenyl 3,5-di-t-butyl-4-hydroxybenzoate; metal complexes, such as nickel complexes of 2,2'-thiobis(4-t-octylphenol); nickel butylamine complex of 2,2'-thiobis(4-t-octylphenol); nickel complexes of bis(4-t-octylphenyl)sulfone; nickel dibutyl dithiocarbamate; nickel salts of 4-hydroxy-3,5-di-t-butylbenzyl phosphonic acid monoalkyl esters where alkyl is methyl, ethyl, propyl, butyl, etc.; nickel complex of 2-hydroxy-4-methylphenyl-undecyl ketone oxime; etc. Further illustrative examples of suitable antioxidants and of suitable supplemental light stabilizers can be found in columns 3 and 4 of U.S. Pat. Nos. 3,488,290 and 3,496,134 and the other patents mentioned therein, all incorporated herein by reference.

The following examples are presented to further illustrate the present invention.

EXAMPLE 1

Preparation of Bis 2-(N,N-dicyclohexylamino)ethyl terephthalate

A solution of 6.09 grams (0.03 mole) terephthaloyl chloride in 25 ml. of benzene was added to a solution of 12.92 grams (0.06 mole) N,N-dicyclohexylethanolamine in 50 ml. of pyridine. The mixture was stirred for several hours and the resulting white solid filtered. The solvent was evaporated and the residue dissolved in benzene, and filtered. Evaporation of the benzene gave a gummy residue which was dissolved in ethanol and chilled. Four grams of a white crystalline solid, melting point 102°–103° C., was obtained. Analysis confirmed the desired product.

EXAMPLE 2

Preparation of Bis 2-(N,N-dicyclohexylamino)ethyl adipate

To a solution of 9.15 grams (0.05 mole) of adipoyl chloride in 25 ml. toluene was added 45.1 grams (0.2 mole) of N,N-dicyclohexylethanolamine at about 5° C. When the addition was completed, the reaction mixture was allowed to warm to room temperature, and then refluxed for 24 hours. The insoluble amine hydrochloride was filtered and the toluene removed in vacuo. One-half of the residue was distilled in vacuo to remove unreacted amine and the residue (6 ml.) was dissolved in hexane and extracted 3 times with methanol, then decolorized with charcoal and the solution evaporated. The residual oil was purified on a column of silica using 9:1 hexane:ethyl acetate as eluent to give 2 grams of a yellow oil which analyzed for the desired product.

EXAMPLE 3

Preparation of N,N-dicyclohexylaminoethyl stearate

To a solution of 22.5 grams (0.1 mole) of N,N-dicyclohexylethanolamine and 15 grams (0.15 mole) of triethylamine in 200 ml. of benzene was added a solution of 30.3 grams (0.1 mole) of stearoyl chloride in 50 ml. of benzene. The reaction mixture was stirred for 4 hours, the insoluble amine hydrochloride was filtered and the benzene solution washed with water, dried over magnesium sulfate and evaporated to give oil, which crystallized on standing. The product was recrystallized from acetonitrile to give 35 grams (71%) of product, melting point 38-40° C., which analyzed correctly for the desired compound.

EXAMPLES 4–7

The additives (0.25 gram) as prepared in Examples 1–3 were each dry blended on a two-roll mill with unstabilized polypropylene (50.0 grams of Pro-fax ® 6401; Hercules Inc., Wilmington, Del.) along with 2,4,6-tri-t-butylphenyl (0.10 gram), a processing antioxidant. The dry blend was milled at 350°–375° F. for 4 minutes and the milled sample was compression molded at 400° F. into films about 4–5 mils thick.

The films were exposed to a carbon arc in a Color Fade-Ometer ® and a Xenon Arc Weather-Ometer (Atlas Electric Devices Company, Chicago, Ill.) until each film showed an increase in carbonyl content of 0.1% by weight as determined by infrared spectrophotometry. This level of carbonyl content coincides with the point of embrittlement of the film. The following results were obtained:

| Example | Additive | Hours to Increase Carbonyl Content 0.1% | |
|---|---|---|---|
| | | Fade-Ometer ® | Weather-Ometer ® |
| 4 | $(-\langle S \rangle -)_2 N-CH_2CH_2-O-\overset{O}{\underset{\|}{C}}-\langle\phantom{O}\rangle-\overset{O}{\underset{\|}{C}}-O-CH_2-CH_2-N(-\langle S \rangle)_2$ | >1500 | 2000 |
| 5 | $(-\langle S \rangle -)_2 N-CH_2CH_2O-\overset{O}{\underset{\|}{C}}-(CH_2)_4\overset{O}{\underset{\|}{C}}-O-CH_2CH_2-N(-\langle S \rangle)_2$ | 400 | 1750 |

| Example | Additive | Hours to Increase Carbonyl Content 0.1% | |
|---|---|---|---|
| | | Fade-Ometer® | Weather-Ometer® |
| 6 | 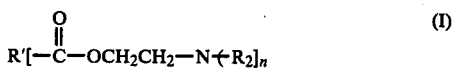 | 500 | 1600 |
| 7 | None | 0-300 | 0-400 |

What is claimed is:

1. A composition of matter comprising a polymer normally subject to degradation by ultraviolet light and an effective amount of a stabilizer compound of formula (I)

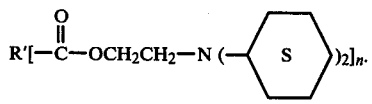

wherein R is alkyl of 6 to 18 carbon atoms or cycloalkyl of 5 to 8 carbon atoms; n is 1 or 2; and R' is alkyl of 9 to 18 carbon atoms, alkylene of 1 to 8 carbon atoms, phenyl or substituted phenyl, phenylene or substituted phenylene, phenylenebis (alkylene) or substituted phenylenebis (alkylene) wherein the alkylene groups have 1 to 3 carbon atoms, and cycloalkylenebis (alkylene) or substituted cycloalkylenebis (alkylene) wherein the cycloalkylene has 5 to 8 carbon atoms and the alkylene groups have 1 to 3 carbon atoms, wherein the substituents are in each case selectd from the group consisting essentially of hydroxyl, alkyl of 1 to 8 carbon atoms, and alkoxy of 1 to 8 carbon atoms, to stabilize said polymer against degradation by ultraviolet light.

2. The compositions of matter as defined in claim 1 wherein the stabilizer compound is

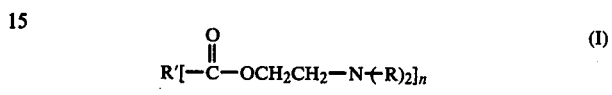

3. The composition according to claim 2 wherein n is 2 and R' is 1,4-phenylene.

4. The composition according to claim 2 wherein n is 2 and R' is 1,4-tetramethylene.

5. The composition according to claim 2 wherein n is 1 and R' is heptadecyl.

6. The composition according to claim 1 wherein said effective amount is about 0.01% to about 5% by weight of said stabilizer compound based on the weight of said polymer.

7. The composition according to claim 1 wherein said polymer is a polyolefin.

8. The composition according to claim 7 wherein said polyolefin is polypropylene.

9. A process for stabilizing a polymer normally subject to degradation by ultraviolet light which comprises incorporating in said polymer an effective amount of a stabilizer compound of formula (I).

wherein R is alkyl of 6 to 18 carbon atoms or cycloalkyl of 5 to 8 carbon atoms; n is 1 or 2; and R' is alkyl of 9 to 18 carbon atoms, alkylene of 1 to 8 carbon atoms, phenyl or substituted phenyl, phenylene or substituted phenylene, phenylenebis (alkylene) or substituted phenylenebis (alkylene) wherein the alkylene groups have 1 to 3 carbon atoms, and cycloalkylenebis (alkylene) or substituted cycloalkylenebis (alkylene) wherein the cycloalkylene has 5 to 8 carbon atoms and the alkylene groups have 1 to 3 carbon atoms, wherein the substituents are selected from the group consisting essentially of hydroxyl, alkyl of 1 to 8 carbon atoms, and alkoxy of 1 to 8 carbon atoms, to stabilize said polymer against degradation by ultraviolet light.

10. The process of claim 9 wherein the stabilizer compound is

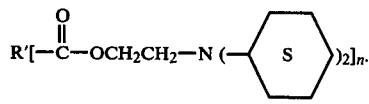

11. The process of claim 10 wherein n is 2 and R' is 1,4-phenylene.

12. The process of claim 10 wherein n is 2 and R' is 1,4-tetramethylene.

13. The process of claim 10 wherein n is 1 and R' is heptadecyl.

14. The process according to claim 9 wherein said effective amount is about 0.01% to about 5% by weight of said stabilizer compound based on the weight of said polymer.

15. The process according to claim 9 wherein said polymer is a polyolefin.

16. The process according to claim 15 wherein said polyolefin is propylene.

* * * * *